United States Statutory Invention Registration [19]

[11] Reg. Number: H251

Field [43] Published: Apr. 7, 1987

[54] INCREASED SAFETY IN USE, AND IMPROVED FUNCTION, OF AMMUNITION ITEMS

[75] Inventor: Werner Field, Rockaway, N.J.

[73] Assignee: The United States of America as represented by the Secretary of the Army, Washington, D.C.

[21] Appl. No.: 892,000

[22] Filed: Jul. 31, 1986

Related U.S. Application Data

[63] Continuation-in-part of Ser. No. 790,579, Oct. 23, 1985, Published Application No. H000136.

[51] Int. Cl.[4] ..... F42B 27/00

[52] U.S. Cl. ..... 102/487; 102/210

*Primary Examiner*—Harold J. Tudor

*Attorney, Agent, or Firm*—Anthony T. Lane; Harold H. Card, Jr.; Michael C. Sachs

[57] ABSTRACT

An electrically detonated fuse for a grenade is shown, used either as a back up system for the usual mechanical detonator, or independently as the sole arming and detonating means. The invention is considered more accurate and dependable than a mechanical system, which is aimed at the objective of reducing the amount of grenade duds, the dangerous phenomenon of still live grenades unexploded upon impact creating a hazardous situation for military and other personnel. The invention uses the ordinary action of the currently used inflated ribbon which is extended from the grenade while it is in flight, to generate an electromotive force signal via a piezoelectric crystal. An electrically activated detonator is installed next to the grenade's main charge, for blowing the device when the electrical detonator is switched on. A large surge of power is fed to the electrical detonator by the closing of an electrical impact fuse, when the grenade physically impacts a target. To store the necessary voltage for detonation a capacitor bank is employed, which store is charged by the said generated e.m.f. signal. The e.m.f. signal is generated through opposite polarization of a piezoelectric crystal, which the ribbon acts on in compression.

5 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INCREASED SAFETY IN USE, AND IMPROVED FUNCTION, OF AMMUNITION ITEMS

The invention described herein may be manufactured, used, or licensed by the Government for Governmental purposes without the payment to me of any royalties thereon.

CROSS-REFERENCE TO RELATED APPLICATION

This application is a continuation-in-part of application Ser. No. 790,579 filed Oct. 23, 1985 now U.S. Statutory Invention Registration No. H000136.

BACKGROUND AND FIELD OF THE INVENTION

This invention relates to the field of submunitions generally, and particularly to the field of grenade fuzes.

Grenades used by the various military services are basic items such as the U.S. Army's M42, M46, or XM77, and are generally armed with a standard fuze such as the M-223. The grenades may be carried in various quantities as submunitions in a variety of items of ammunition on a carrier which delivers them to a point above a target where they are ejected at various altitudes from the carrier by preset fuzing. The items, upon entering the airstream are still in a safe condition since the point of the arming screw is held fixed, preventing arming until the rotation of a trailing ribbon, which extends in flight, rotates enough to release it. In practice, a small percentage of the large number of grenades normally launched at a target area will fail to function as intended and will remain as duds dispersed in the field. The causes of such failures can range from complete failure to deploy the tape stiffener assembly to items which landed at such a flat angle that the component of the inertial force in the direction of the arming stem was insufficient to fire the item; in the case of deployment by rockets, the necessary rotation to cause arming is not as positive as it is in the case of artillery-launched grenades. Such items, when disturbed or handled, can function and represent a threat to friendly personnel. Entry into the infested zone is therefore hazardous and must await the time consuming clearing operations. In addition, trained enemy personnel may reclaim some portion of the duds and use them against friendly targets. Any improvement therefore in the elimination of grenade fuze duds, is an object of great usefulness to this field.

BRIEF SUMMARY OF THE INVENTION

These, and other difficulties are overcome by the provision of an electrical backup system which will function to detonate the said grenade, when the ordinary mechanical system which usually arms and also operates the detonator on impact with the target, fails to do so. An electrically operated detonator, placed near the main charge, blows the grenade when a large voltage is applied to it. The voltage is only fed to the said detonator upon the closing of an impact switch, which is activated upon a physical impact upon it at reaching the target. While the voltage might be stored in a battery, or loaded in a capacitor bank in advance, for dependability and economy, it is instead generated "on-board" by utilizing a piezoelectric crystal being acted upon by the sudden deployment of the tape stiffener assembly. The generated e.m.f. is stored in a capacitor for later discharge through the impact switch, to the mentioned detonator. In addition, the need for rotation to arm the item is eliminated by the use of a shear wire retaining the firing pin, and, in turn the slider in a safe position until the tape stiffener assembly's deployment shears it.

OBJECTS OF THE INVENTION

Accordingly, it is one object of this invention to provide a means of lessening or eliminating the amount of dud grenades dropped over a target area, for safety sake.

Another object of this invention is to provide a more efficient detonating system for a grenade, to replace, or back up the mechanical safety-arming system.

A still further objective of this invention is to advance the art of electrical, versus mechanical detonation of submunition devices, particularly for miniaturizing such systems for inclusion in grenade devices.

Other objects and advantages of this invention will become apparent from a reading of the attached specification and drawings, in which:

LIST OF FIGURES

DETAILED DESCRIPTION OF THE FIGURES

Figure 1:
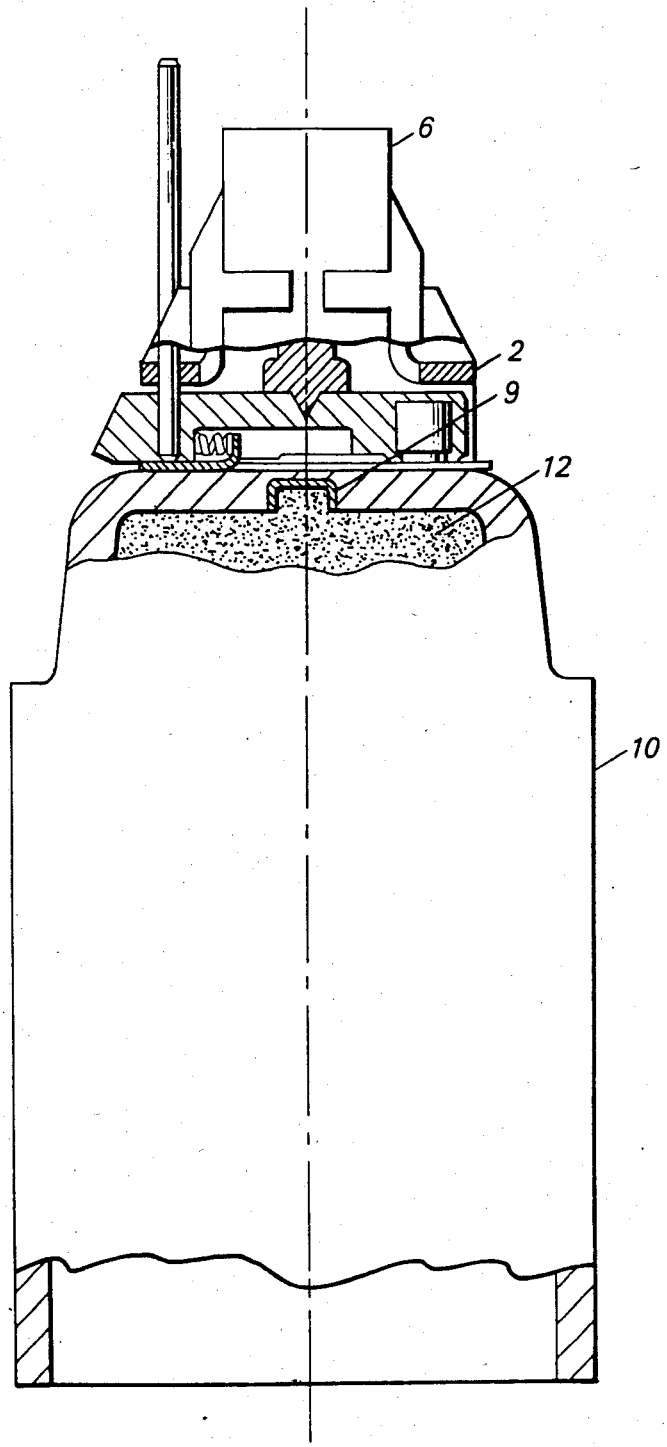
FIG. 1 shows a grenade device which includes a mechanically activated fuze device.
Figure 2:
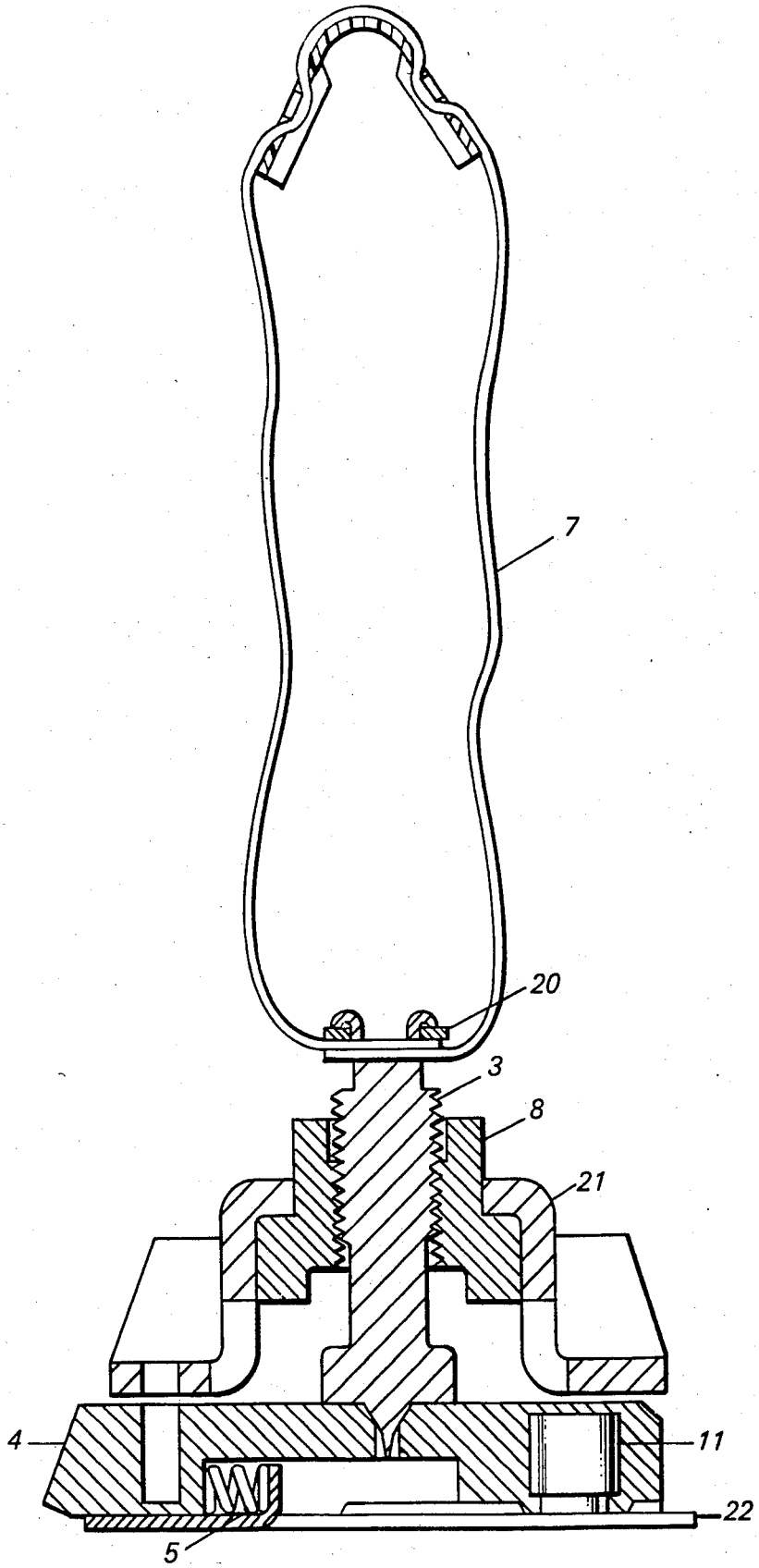
FIG. 2 shows a more detailed view of a safety and arming, fuze device.

In FIG. 1, there is shown a grenade, which is armed by a fuze (2), which is shown in greater detail in FIG. 2. Such grenades as mentioned earlier may be carried airborne in various quantities as submunitions in a variety of items of ammunition. The carrier delivers them to a point above the target where they are ejected at various altitudes from the carriers by preset fuzing. The items, upon entering the airstream are still in a safe condition since, as shown by FIG. 2, the point of the arming screw (3) interferes with movement of the slider assembly (4) to the armed position under the action of centrifugal force and the arming spring (5). This keeps the detonator (11) out of line with the arming screw and the lead assembly (9) (shown in FIG. 1). In normal action, the air stream at this point deploys the folded tape stiffener assembly (6) as shown in FIG. 1, which is securely attached to the arming stem. On being fully extended, the tape stiffener assembly, deploys loosely as a loop (7), shown in FIG. 2, and acts to stabilize the grenade during its descent; it also is retarded with regard to rotation, establishing a relative rotation between tape and grenade. This causes the arming screw (3) to unscrew from the weight (8). When the threads have become thus disengaged, the arming screw releases the slider assembly (4) to move to the armed position with the detonator in line under the firing point of the arming screw and in position above the lead charge (12) in the grenade body loading assembly (10). The arming screw continues free-wheeling rotation under the action of the tape stiffener assembly. On impact, inertia drives the arming screw-weight combination forward; this occurs with sufficient energy to initiate the detonator (11). This, in turn, fires the lead charge and the main explosive charge (12) in the grenade body loading assembly which completes the mission of the grenade as munition.

Figure 3:
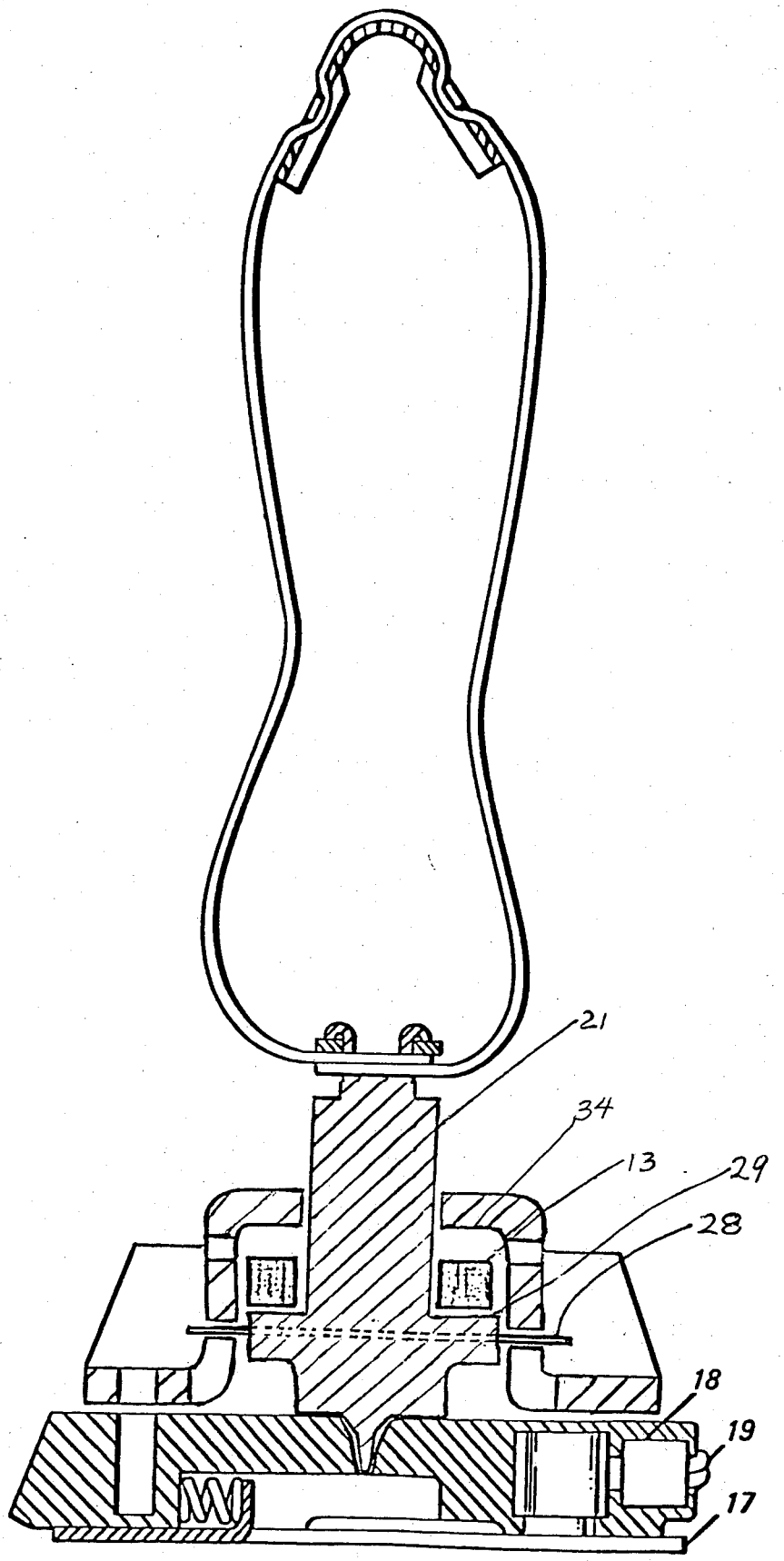
FIG. 3 shows an improved fuze device including electrical generation and detonation means according to this invention.
Figure 4:
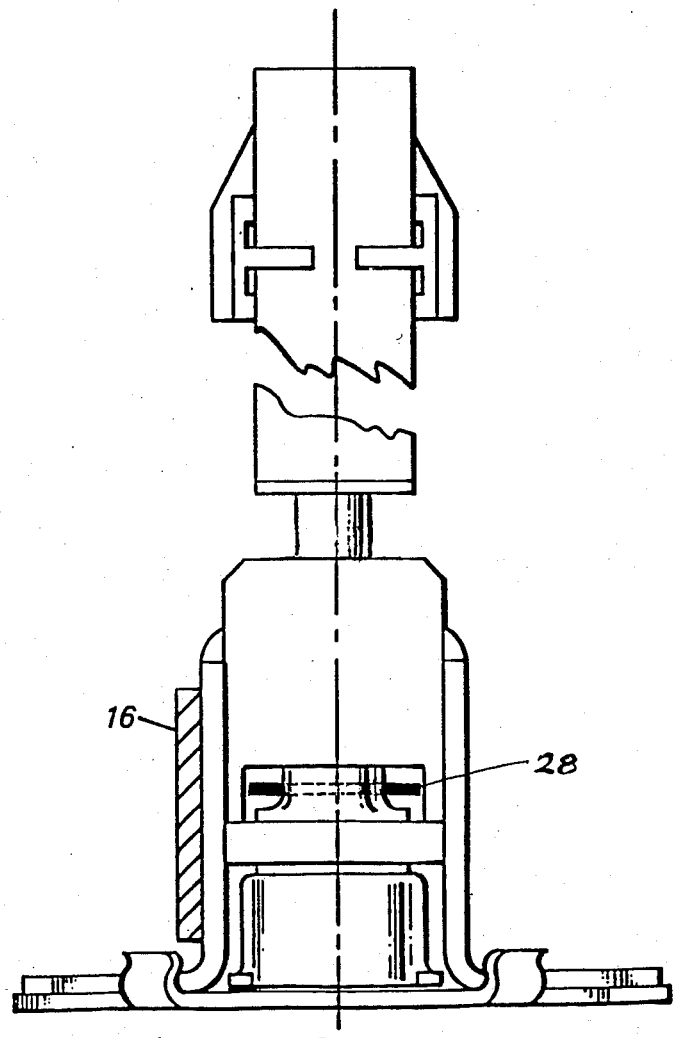
FIG. 4 shows an assembly of the electrically improved fuze in position on the grenade.

In FIG. 3, an improved fuze is shown, which is based on the principle of using the retarding action of the tape stiffener assembly, and the jolt resulting from its deployment, to cause an electromotive force to be generated by means of a piezoelectric crystal when the grenade descends after expulsion from the carrier. This is achieved by installing a piezoelectric crystal (13) in a modified version of the fuze. The deployment of the tape stiffener assembly causes the shear pin (28) to be sheared and the piezoelectric crystal is stressed by compression between the inside area (34) of the fuze housing and the shoulder (29) on the arming stem. This action generates the required e.m.f. In a small circuit board (16) attached to the fuze housing (21 in FIG. 2), illustrated in the FIG. 4 assembly, is found a basic circuit (FIG. 5) for storing the generated e.m.f. signal for later use in detonating the grenade, to be explained below. The slide assembly (17) shown in FIG. 3 is modified by extending its length sufficiently so that a low energy electric detonator (18) may be inserted and secured. Its output charge is in proximity of, and aimed at, the detonator (11) shown in FIG. 2. The leads of the detonator (19) are connected to the output terminals of the circuit board.

Figure 5:
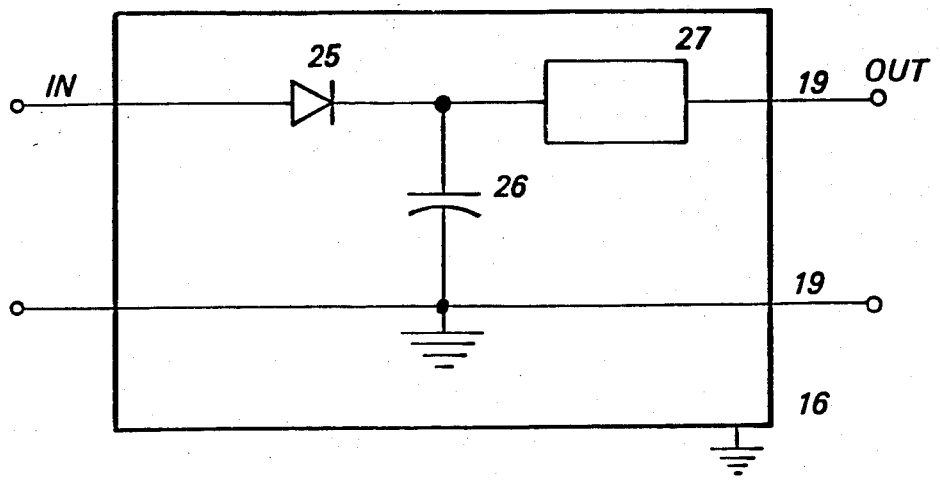
FIG. 5 shows an electrical detonation circuit for the improved fuze, according to this invention.

In FIG. 5, a basic circuit for conditioning the said generated e.m.f. signal of the piezoelectric crystal (13) is shown. A capacitor bank (26) functions to store up the signal that passes out of the crystal, such charge released by impact fuze 27, out through lines 19 to electrical detonator 18 which is illustrated in relation to FIG. 3. The impact fuze is explained as a physical device which closes a circuit upon physical impact of the grenade with the target; it might be a device which closes the circuit when it is physically crushed, bringing certain elements into electrical contact; though other types of such switches might be used. If the fuze functions as intended via its kinetic energy system, i.e., mechanically as in the operation of FIG. 2 for example, even though the capacitor 26 will charge up and on impact, the impact switch 27 will function the electric detonator, yet this detonation action would become superfluous; the capacitor discharge will be electronically delayed to occur after detonator (11) has had a chance to function. However, if the fuze arms, then arming spring 5 slides 4 against 11, but the kinetic energy system firing pin (21) striking detonator (11) fails to function, then electric detonator 18 will at least ignite detonator (11) (as in FIG. 2) thus either propagating to the lead and main charge, or removing all primary explosive from the "duds" by destroying detonator 11, hence the concept of an electrical system as a backup. If the tape stiffener assembly (6) functions as intended, but the slide assembly (4) fails to move to the armed position, the electric detonator will still function to blow the detonator (11) and thus rid this otherwise resulting dud of all primary explosives, making it safe to handle. However, if the ribbon (7) never deploys, the shear pin (28) will not be broken and, as a result, the slide assembly (4) will keep detonator (11) out of line and no e.m.f. will be generated, and both detonators will fail to function. However, duds will still be safe to handle since they are not even armed. Another possibility for the grenade is to simply replace detonator (11) with an electric detonator entirely and use the system described above alone to generate electrical energy to fire detonator (11) by way of (18). The electrical system herein is believed far more sensitive in fact than the current kinetic system, and will thus reduce the number of duds resulting from grenades impacting at too shallow an angle.

While the invention may have been described with respect to a particular embodiment or embodiments, other modifications and substitutions possible within the scope of the invention, as will occur to those skilled in the art, are also included herein in this invention. This includes use of the stored voltage, or a portion thereof, for purposes other than just firing the electric detonator.

What is claimed is:

1. An electrical fuze for use in detonating a grenade which includes a main charge and a deploying ribbon loop for arming the grenade, said fuze comprising:
   - means including a piezoelectric crystal for generating an electromotive force signal by the retarding action of said ribbon when deployed;
   - electrical circuit means for conditioning and storing said signal for use in detonating said grenade;
   - electrically operated detonation means for setting off the main charge, receiving a conditioned signal from said electrical circuit means;
   - means for closing a circuit upon a physical impact, said switch means positioned between said electrical circuit means and said detonation means.

2. A fuze as in claim 1 wherein said ribbon comprising a tape stiffener assembly and said means for generating a signal includes causing opposite polarization of a piezoelectric crystal which the ribbon acts on in compression.

3. A fuze as in claim 2 wherein said elecrical circuit means comprises a half-wave rectifying diode in series with a capacitance bank.

4. A fuze as in claim 3 wherein said switch means comprises an impact fuze.

5. A fuze as in claim 4 including an arming stem comprises a shear pin, which pin is sheared by the deployment of said tape stiffener assembly, permitting said compression of said piezoelectric crystal between a shoulder of such stem and the fuze housing.

* * * * *